United States Patent [19]
Jakobson

[11] 3,992,093
[45] Nov. 16, 1976

[54] APPARATUS FOR THE PREPARATION OF COPIES DURING BOTH DIRECTIONS OF RELATIVE MOVEMENT OF AN ORIGINAL

[75] Inventor: Hans Jakobson, Quickborn, Holstein, Germany

[73] Assignee: Lumoprint Zindler KG, Hamburg, Germany

[22] Filed: Nov. 12, 1974

[21] Appl. No.: 523,064

[30] Foreign Application Priority Data
Nov. 23, 1973  Germany............................ 2358370

[52] U.S. Cl. .................................... 355/51; 355/8; 355/49; 355/66
[51] Int. Cl.² ........................................ G03B 27/70
[58] Field of Search ............... 355/49, 51, 66, 8, 43, 355/75, 1

[56] References Cited
UNITED STATES PATENTS
| | | | |
|---|---|---|---|
| 3,216,316 | 11/1965 | Brownscombe...................... | 355/66 |
| 3,625,606 | 12/1971 | Rosenberg............................ | 355/66 |

*Primary Examiner*—L. T. Hix
*Assistant Examiner*—J. A. LaBarre
*Attorney, Agent, or Firm*—Toren, McGeady and Stanger

[57] ABSTRACT

A document copying machine is disclosed, of the type in which the original moves reciprocally relative to an illumination slot so as to be exposed line-by-line from one end to the other, a receptor element, which may be a copy sheet taken from a supply stack, a selenium drum or other receptor surface, moving in one direction and having an image of the original transmitted to it by image beam guide devices located between the illumination slot and the receptor element. The machine has double the productive capacity of conventional copying machines where there is relative movement of the original and the exposure or illumination slot, in that a copy-producing image is transmitted, on relative movement of the original and the slot in one direction, on to a receptor element and a second copy-producing image is transmitted, on opposite relative movement of the original and the slot, on to a second receptor element or on to the same receptor element moved to a further position. The images of the original are transmitted by way of reflector or prism systems cooperating with at least one objective lens in such a way that an image of the original is transmitted true-to-line by one system as relative movement of the original and the slot takes place in one direction and a second image of the original is transmitted, again true-to-line by reason of line and side reversal, as relative movement of the original and the slot takes place in the other direction, the second reflector or prism system moving into place or otherwise becoming operative, instead of the first reflector or prism system, as the original and the slot reach the end of their relative movement in the first direction.

26 Claims, 16 Drawing Figures

APPARATUS FOR THE PREPARATION OF COPIES DURING BOTH DIRECTIONS OF RELATIVE MOVEMENT OF AN ORIGINAL

The invention relates to an apparatus for the preparation of copies, having a carriage-like support or conveyor device for an original, which support or conveyor device is reciprocably-movable on or in an apparatus housing relative to an illumination device with an illumination slot, wherein, during an operative forward movement in one direction, an image of the original matter is transmitted by way of an image beam guide device to a receptor element which moves in one direction inside the apparatus synchronously with the original.

Such known forms of apparatus require a forward movement and a rearward ovement of the carriage-like original support or conveyor device for each illumination step. Exposure of the original takes place only in one direction of movement of the original on its support or conveyor, since the image beam guide device effects an exposing illumination of the original image matter only in such one direction of movement on to the receptor element, itself moving only in one direction. A receptor element can be a drum rotating in one direction, for example a selenium drum of a xerographic apparatus, or alternatively a copy material sheet with a coating, which in the copying method with photo-conductive layers may be a zinc oxide coating or a similar coating, or in a photographic method may be a sensitive coating for carrying out the chemical silver salt diffusion process, or in a thermographic method it may be a coating which forms colour selectively in dependence upon incident heat etc.

The known forms of apparatus therefore take a considerable time for the preparation of copies, since the formation of a copy image always necessitates a forward and rearward movement of the original or of the carriage or conveyor carrying it. Since multiple copies (duplicating) are being made increasingly, namely several copies from each original, a considerable expenditure of time occurs especially in this case and the idle return movement of the carriage gives rise to a non-rational operative phase of the apparatus. Multiple copies are made increasingly under the procedure in which, where documents are to be produced in many copies, only an original is made, many copies of which are then made by using a copying machine in the duplication mode. From this standpoint, copying machines are to be seen as office system rationalisation devices, the use of which is of increasingly important cost-effective significance.

The invention is based on the fact that, in exposure devices, it is known that a reflector can be arranged behind an objective lens at right-angles to the axis of the objective. The objective lens can be regarded as half a double anastigmatic lens. Reflection takes place at the reflector and the image beam emerges again in the opposite direction at the same angle in relation to the incident angle, angularly deflected in the opposite direction. With the arrangement of the original image at a distance equal to the focal length of the lens, an image of the same size, but rotated through 180° and true to size, is produced at the same distance.

The invention is therefore based on the object of improving an apparatus of the type stated in such a way that idle strokes or movements of the carriage-like original support or corresponding means of transport are avoided and in practice a doubling of the utilisation of the apparatus is obtained, whereby the forward and return strokes can be utilised with more economical means for making a copy in a copying machine than has heretofore been known.

This problem is solved according to the invention in that both the forward stroke and also the return stroke of the original are provided for image transfer and the image beam guides can be changed over or varied in such a way that an image of the original can be transmitted during the return stroke onto the receptor element as it advances or onto a further raceptor element, in the same way as an image of the original on the forward stroke, a reflector or prism arrangement with two reciprocally-movable reflector or prism systems is provided behind an objective lens which can be moved selectively in the image beam, wherein a reflector or prism system is provided as a parallel reflection system with an effective angle of 90° for a true-to-line image reversal in the line, and the former lies with its edges at right-angles to at least one image slot and the other with its edges parallel to at least one image slot.

A special advantage resides in the fact that the image beam guides can be moved along a shorter path, which is very much shorter than the path of movement of the original or of the receptor element. This simplifies mounting and increases the working speed. The working time is already considerably reduced by the fact that both the forward and the return stroke can be used for making a copy.

It is surprising to find that, while avoiding use of a complicated prism system which has to be moved in a predetermined manner and while avoiding expensive fibre-optic devices, the necessary image inversion is possible by simple means, merely a shift of the two reflector or prism systems being necessary. The lens i.e. the objective is matched in its optical design to the reflector or prime system. If two reciprocably-movable mirror or prism systems are arranged behind a lens, it will be understood that this means that only one lens is provided, or else that the reflector or prism systems are each permanently located behind a lens, so that these lenses can be moved to-and-fro with the respectively associated reflector or prism systems. This has constructional advantages.

It is preferred that the effective 90° angle be formed by a 45° or 22.5° pentagonal system.

According to another preferred embodiment, the other reflector or prism system has an angle of reflection which is varied in relation to 90°, for reversal to suit the return stroke.

It is preferable for the so-called other mirror or prism system to have a different angle, preferably at the order of 3° to 10°, and in an advantageous embodiment the other reflector or prism system in construction with 84° or 96° minus that angle behind the lens.

With a parallel arrangement of the so-called other reflector or prism system to the exposure slot, only about 50 % of the available light is utilised which strikes the lens. This is due to the fact that the angle of reflection which is varied in relation to 90° leads to the projection of two images, only one of which is used.

In order to obtain the same conditions in the reciprocal movement, two possibilities are afforded. On the one hand, provision is preferably made for the intensity of exposure to be variable as a function of the use of a reflector or prism system in the image beam, a reduction in brightness being provided by the partial switching off of exposure light sources or by diaphragms in a reflector or prism system with edge positions perpendicular in relation to the direction of the exposure slot. This saves power and gives the possibility of keeping the other working factors equal.

On the other hand, one preferred embodiment provides for the extent of movement of the original of the support for the original which is employed, according to the above viewpoint, with half the light output, is performed instead at twice the speed of movement. In this way, the utilisation of the device can be improved, but additional arrangements in connection with charging, toning, fixing and so on are necessary. However, compared with embodiments heretofore known, the result obtained is such that not only is the return stroke used in addition for producing the image, but in one direction of movement a higher working speed is feasible.

In order to influence the intensity of the exposure illumination, in a particularly suitable embodiment, a stopping-down system is used when the effective 90° reflector or prism system is switched on, i.e. in particular when the original and the receptor element operate in opposite directions and, especially, in a direction which lies parallel to the edges of a reflector or prism system.

With the use of two lenses, these can be designed from the outset in accordance with the light output needed in each case. No additional means are then needed.

An advantageous embodiment of such stopping down resides in the provision of a mask or light-absorbing diaphragm between the lens and reflector or prism system. According to another embodiment, a series resistance can be inserted in the energy supply leading to the light sources.

According to a preferred embodiment, a reflector system is arranged between an exposure slot and a camera unit, in particular preferably an angular reflector system, which is provided with its bisector on the axis of the lens and, with its limbs reflects the image beam aligned with the exposure slot and the image beam aligned to the camera unit. This provides the pre-requisites for a paraticularly suitable design of the instrument. This includes the fact that the optical system with the angular reflector, including the sources of illumination, is arranged pivotably in relation to a drum-shaped camera unit located pivotably under a concentrically-curved original plane and the pivoting movement is controlled synchronously with the advance movement. The latter is known in so-called xerographic apparatus which operates with a selenium drum. Provision is furthermore made according to another suitable design for locating only one deflection mirror between the optical system and the illumination slot, under which the image beam from the optical systems falls directly on to the receptor element, which is guided at right-angles to the original. It is the latter feature in particular which makes it possible to arrange existing instruments in a particularly favourable way, these preferably being instruments which operate with a coated receptor sheet on which the image is exposed to light and on which also the image is developed.

According to a further preferred embodiment, not only is one reflector or prism system provided with an effective 90° angle, or a somewhat altered 90° or possibly 45° angle, but also in particular in conjunction with the lens, a parallel system of rows of such prism or reflector systems is provided, in order to simplify the lens. Moreover, the theoretical distance between the two halves of the lens become smaller, the larger the number of reflector or prism systems in the system of rows.

Furthermore, the arrangement of a diaphragm is preferred in order to preclude marginal rays or to compensate for brightness in relation to the other arrangement.

The invention is explained below with reference to preferred embodiments, which are represented in the accompanying drawings. In these.

Figure 1:
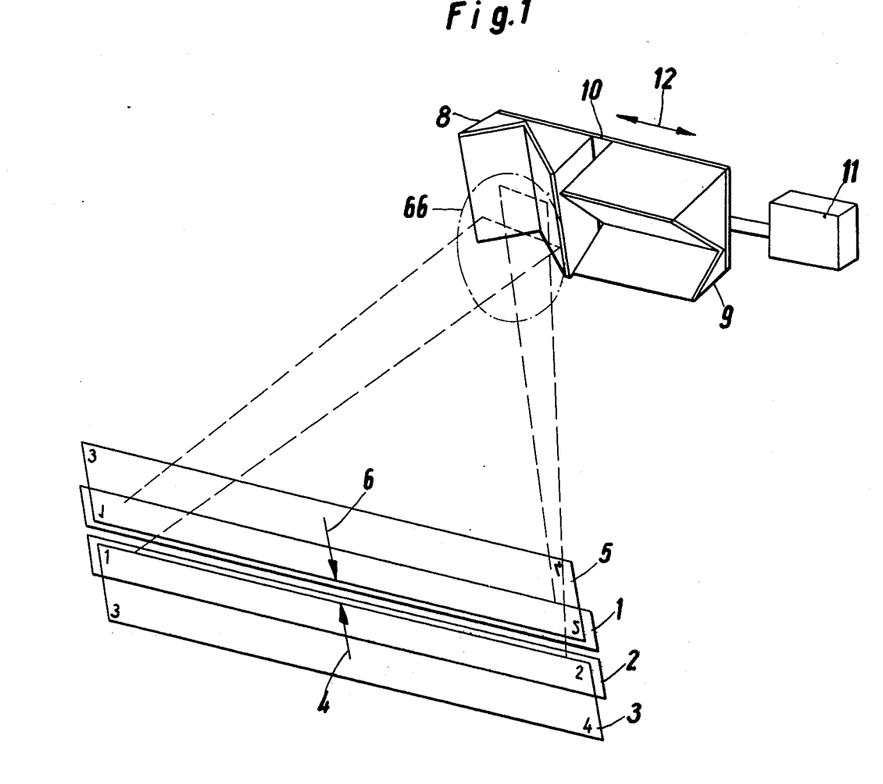
FIGS. 1 and 2 show diagrammatic illustrations, for explaining the operation of an embodiment with angled mirrors, wherein the original slot and image slot are arranged, and in FIGS. 1 and 2 the different directions of movement of the original are represented.
Figure 2:
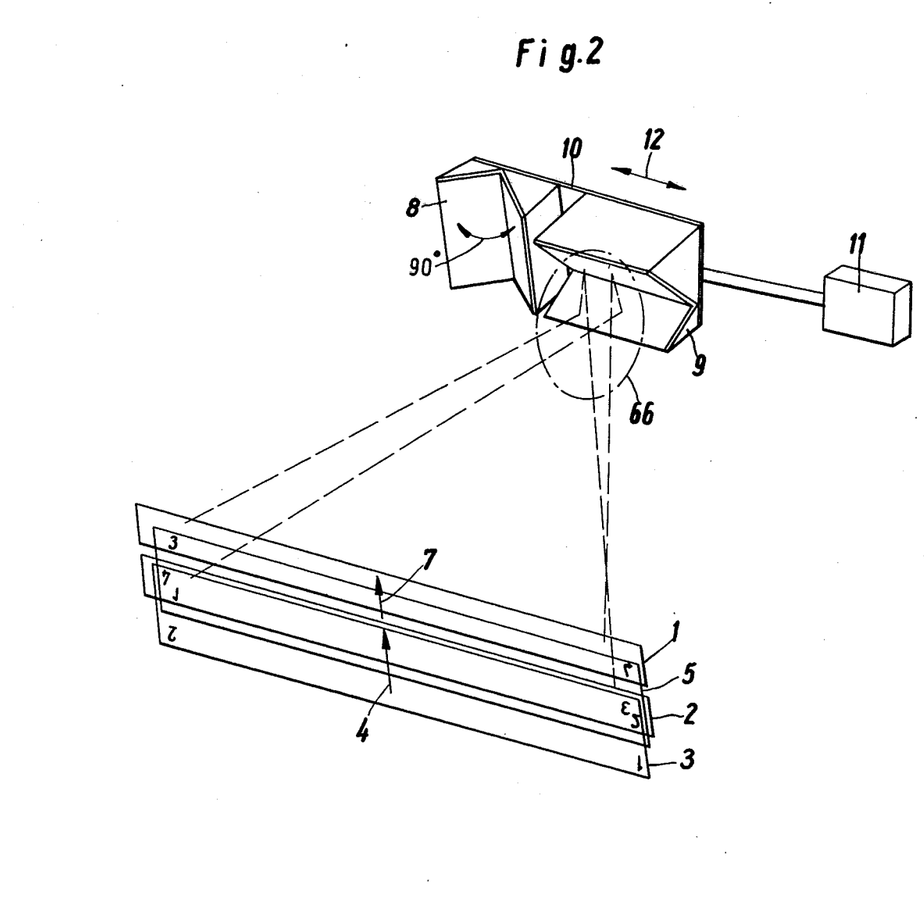

In FIGS. 1 and 2, the principle according to the invention is described in broad outline. These show, first, two slots 1 and 2. The slot 1 is the illumination or exposure slot past which the original is moved in known manner, as explained below in conjunction with FIG. 8 et seq. The slot 2 is the so-called imaging slot, which can either be limited by diaphragms or is not more precisely defined and is located inside the apparatus, past which a receptor element is moved, i.e. either, for a so-called indirect copy, a selenium drum from which a powder image is transferred in the usual way, as explained with reference to FIGS. 8 to 10 or, for a direct copy, a coated copy material, as described with reference to FIG. 11, wherein, between the two systems, different picture deflection means are located.

The receptor element 3 is moved past the slot 2 in the direction of the arrow 4 and in the same sense, that is in this diagrammatic explanation, there is produced in the slot the moving image of the original. It will be seen that the arrow 4 always moves in the same direction. The original, indicated as 5, moves in contrast, in alternate directions, i.e. first in the outward and then in the return stroke, according to the arrows 6 (FIG. 1) and 7 (FIG. 2).

In FIGS. 1 and 2, a reflector arrangement is provided with two reflector systems 8, 9. It will be seen from FIG. 1 that the angular reflector system 8 is located in the effective position. In the reverse direction of movement of the original, on the other hand, the angular reflector system 9 is moved into the effective position. The two reflector systems are joined together rigidly by means of a support 10, shown diagrammatically, and a driving arrangement 11 operates on this support, which can move the angular reflector systems to an fro in the direction of the double arrow 12, adjustment in relation to the lens 66 being determined by abutments not shown in detail. The driving arrangement 11 can consist, for instance of a magnetic relay which acts against a restor spring when the stated abutments are provided. When using two lenses, these are connected to the support 10.

It will be seen that the driving arrangement 11 is designed on simple lines and represents only one switching element, which does not have to be synchronized with the movement of the original or of the recording material.

It will be seen in FIG. 1 that the original and the receptor element are transferred in opposite directions. The original 5 is guided with the image facing the imaging slot 1 by means of conventional roller or other arrangements. The beams, indicated diagrammatically, show that the image is transferred true-to-line with reversal, to which the lens 66 also contributes, that images are produced on the receptor element which can be read from the back, i.e. which in the practical embodiment are readable when transmitted in the form of a powder image. The arrangement is therefore particularly suited to such an instrument, for instance with a selenium drum.

The same thing applies to FIG. 2, in which the receptor element 3 and the original 5 are transported according to the arrows 4, 7 in the same direction, i.e. the original performing a return stroke, for instance. In the original, as the figures entered at the corners show, the markings are arranged in the same direction and on the receptor element, as is important having regard to the return movement, the markings are represented upside down and trueness of line is provided, i.e. the ends of the lines are not changed over.

In FIGS. 1 and 2, so-called reflector systems are provided. Constructions with other reflection arrangements or materials, giving corresponding effects, are also included.

Figure 3:
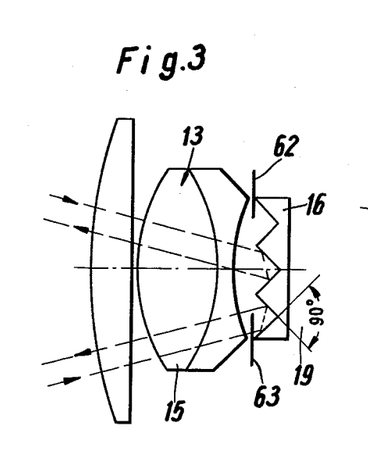
FIGS. 3 and 4 show diagrammatic side views of prism arrangements in a particularly advantageous embodiment, to explain particularly favourable economic developments to meet the conditions of FIGS. 1 and 2.
Figure 4:
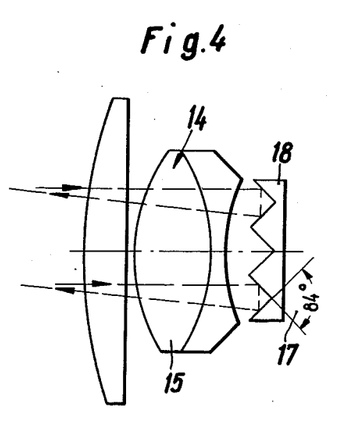

FIGS. 3 and 4 show instead their objective systems, which are indicated generally at 13, 14, with the associated prisms 16, 18, since the spacing of the two halves of the lens varies as a function of the so-called multiple prism arrangements. These prism systems have an objective lens 15 and, in comparison with the effective 90°-angle reflector system 8, a multiple 90° prism design 16, instead of the angled reflector system 9 a multiple prism arrangement 18 formed with a different angle 17, for instance with an angle 17 of 84°. The angle 19 of the prism arrangement 16 amounts effectively to 90°. From the beams drawn, it may be seen that with these there are parallel incident and emergent beams, while according to FIG. 4 intersecting beams are produced, as is also explained by reference to FIG. 2. According to FIG. 3, diaphragms 62, 63 are arranged for observation which are preferably provided so as to be moved sideways.

Figures 5A, 5B:
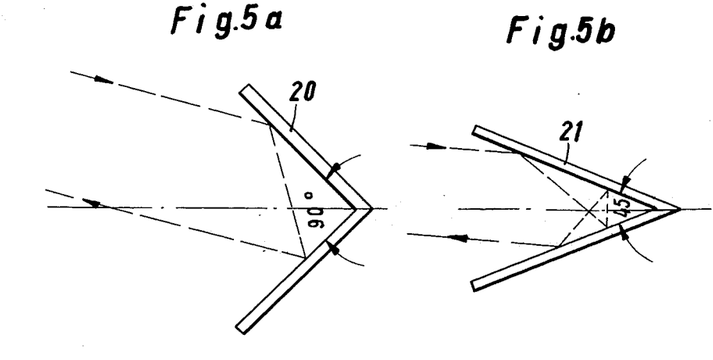
FIGS. 5a and 5b show an angle mirror arrangement with a modification for explaining the angle mirror arrangement employed in FIG. 1.
Figure 6:
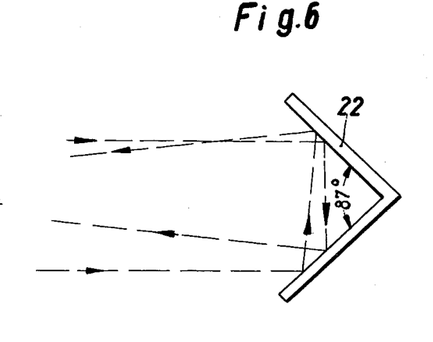
FIG. 6 shows a diagrammatic representation of the function of the angle mirror arrangements shown in FIG. 2.

FIGS. 5a and 5b show that, for the parallel beam arrangement, not only is a 90° design suitable for a reflector system 20, for instance, but also a 45° reflector system 21. Corresponding conditions hold good for the reflector or prism system with an angle deviating from 90°, for which in FIG. 6 an angular reflector system 22 with an 87° divergent opening is shown. It will be seen that as regards the incident and emergent rays, having regard to FIG. 5b, a different angular arrangement could be provided, for instance of the order of 42.5°, but this is not represented in detail.

Figure 7:
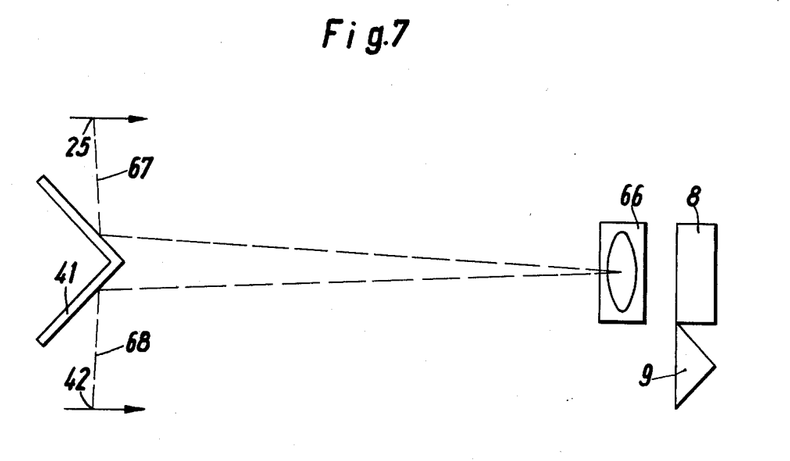
FIG. 7 shows a diagrammatic side view of a deflection arrangement in a form of the apparatus which is explained below in detail.

FIG. 7 shows a combination of the lens 66 and the two reflector or mirror systems 8, 9 of the form of construction already described with a 90° angular reflector 41, from which the image beam 67 is deflected from a original on an exposure slot at 25 to the lens and on from the latter via the angular reflector 41 as an image beam 68 to an image slot at 42 on to a receptor element. In the embodiment shown, the 90° angular reflector system 8 is moved into the path of the beams.

Figure 8:
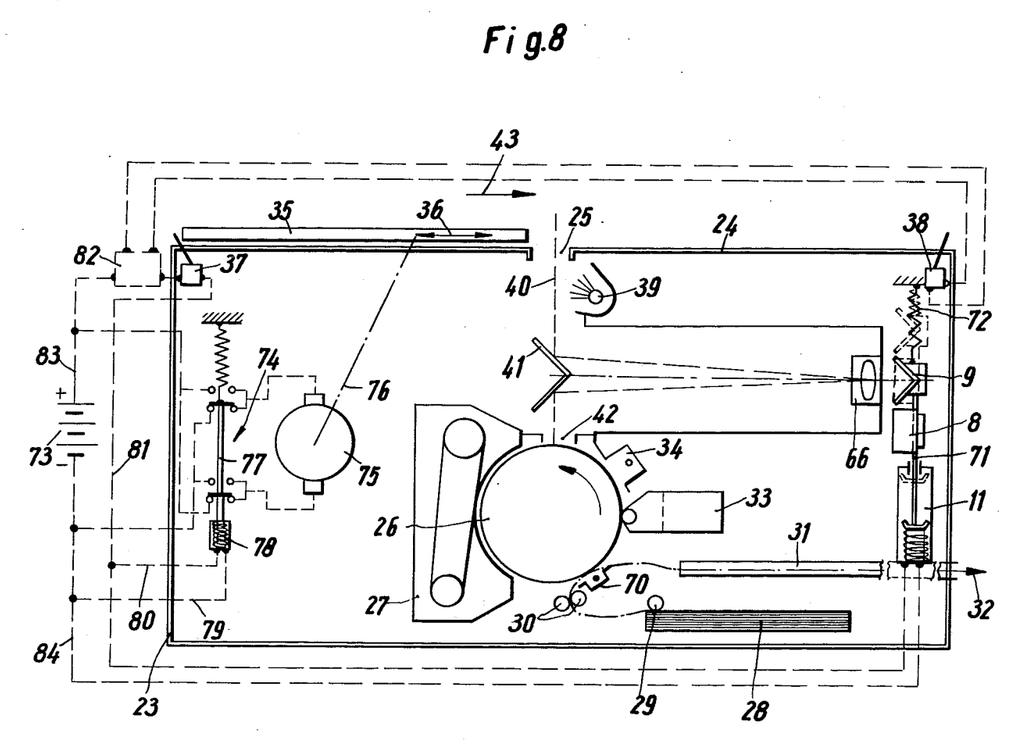
FIG. 8 shows a constructional arrangement of the apparatus, for the use of the system according to FIGS. 1, 2 and 7 in conjunction with a diagrammatically represented embodiment of the apparatus.

FIG. 8 shows an example of a copying machine with a housing 23. An exposure slot 25, comparable with the exposure slot 1 in FIGS. 1 and 2, is arranged in its upper wall. As the receptor element, a so-called selenium drum 26 is mounted. A latent image is produced on the latter and is developed by a developing device 27, a powder scattering or distributing device of known type. After development, a copy sheet is guided from a store 28, with the help of extraction means 29, to the periphery of the drum 26, for instance by means of a driving device consisting of two rollers 30. During contact with the drum, image transmission takes place under the action of corona charging device 70. After transmission of the image, the copying sheet is carried away by a fixing device 31 in accordance with the arrow 32. It is to be understood that a known cleaning arrangement and also a discharge device are arranged at 33. A corona charge is applied to the surface of the drum at 34, to prepare for the next exposure operation.

An original is moved to and fro, according to the double arrow 36, over the slot 25 by means of a so-called original carriage 35. The movement can be reversed by limit switches 37, 38. The limit switches 37, 38 at the same time control the driving arrangement 11 which accordingly is also represented in FIGS. 1 and 2 and consists according to FIG. 8 of an actuating magnet, on whose actuating rod 71 are arranged the angular reflection systems 8, 9. This actuating rod 71 is suspended at its end facing away from the actuating magnet from a tension spring 72 which pulls the actuating rod with the reflector systems and the armature of the magnet into an open position, when it is de-energized. This position is shown in broken lines and it may be seen that then the prism or angular reflector system 8 is arranged behind the lens 66. It should also be noted that two lenses 66 may be provided, each rigidly connected to a prism or angular reflector system 8, 9.

The imaging slot 25 is illuminated, for instance by a light source 39. The imaging beam 40 is passed via an angular reflector 41 with an optical angle of 90°, to the lens 66, received by the latter and projected on to the selenium drum over which the imaging slot 42 is located according to FIG. 2. In this case, an image inversion can take place at 41.

In the direction of movement according to the arrow 43 in FIG. 8, the system 9 deviating from 90° is arranged behind the lens 66. During the return movement, by means of the driving arrangement 11 in FIGS. 1 and 2, the other system 8 would be placed behind the lens.

FIG. 8 also shows the control means. A voltage source 73 is connected to a reversing switch shown generally at 74. This motor drives the original support carriage 35 through a transmission 76. The switching member 77 of the reversing switch for the direction of rotation is actuated by an actuating magnet 78, which is connected by a supply lead 79 to earth and by the other supply lead 80 to a control line 81. The actuating member 11 is connected accordingly.

Both the limit switches 37, 38 operate via a relay control element 82 in such a way that, in one direction of movement of the carriage 35, the actuating magnets 11, 78 are excited and, in the other direction of movement, they are switched off and disconnected from the excitation source, so that alternate adjustment is produced. The other supply circuits to the corona device, the development device and to the light source are not shown in detail. They can be switched on in the usual way as a function of the movement of the original. Much the same applies to the copy paper extraction means 29 and the fixing device 31.

It will be recognised that the voltage source 73 is arranged in a lead 83, which continues as far as the driving arrangement 11, the latter being connected to the control line 81 and the lead 83, the part 84 of which is earthed in practice. A corresponding connection is provided for the actuating magnet 78 and the reversing switch for the direction of rotation 74.

Figure 9:
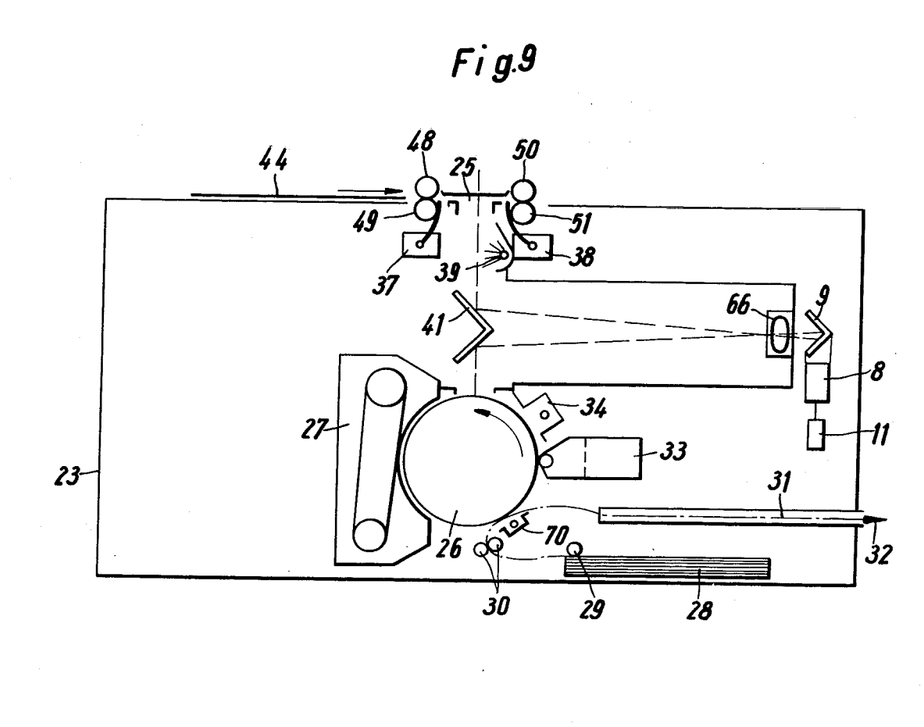
FIG. 9 shows a view according to FIG. 8 of a somewhat modified form of the apparatus.

FIG. 9 shows a machine corresponding to FIG. 8, the same parts being denoted by the same references. In this embodiment, the changeover switches 37, 38 are arranged close to the exposure slot 25. While the embodiment according to FIG. 8 with a carriage 35 is suitable for originals in the form of books, FIG. 9 operates with an original 44 in sheet form. Whereas according to FIG. 8 the carriage actuates the switches 37, 38 with its ends, the original 44 operates corresponding switches 37, 38 with its leading and trailing ends in order to bring the systems 8, 9 behind the lens 66 in accordance with the direction of movement.

For guiding the original 44, use is made of roller pairs 48, 49 and 50, 51, one on either side of the exposure slot 25. Several pairs of rollers can be provided. Control by the switches 37, 38 takes place in such a way that one end of the original is always within one of the pairs of rollers if a reversal of direction of movement takes place. This gives the possibility of arranging the switches 37, 38 immediately next to the exposure slot 25, so that the reversal finally takes place from the release of the switch component by the rear end of the original in the respective direction of movement. At the same time, one of the switches can be constructed with a predetermined switching delay period, which in the case of individual copies makes it possible to transfer the original out of the pair of rollers. In the case of multiple copies, the delay only takes effect when the last copy has been made.

The prism or angle reflector systems 8, 9 are controlled in the same way as has been described by reference to FIG. 8. The pairs of rollers 48 to 51 are accordingly driven via a transmission by the motor 75.

Figure 10:
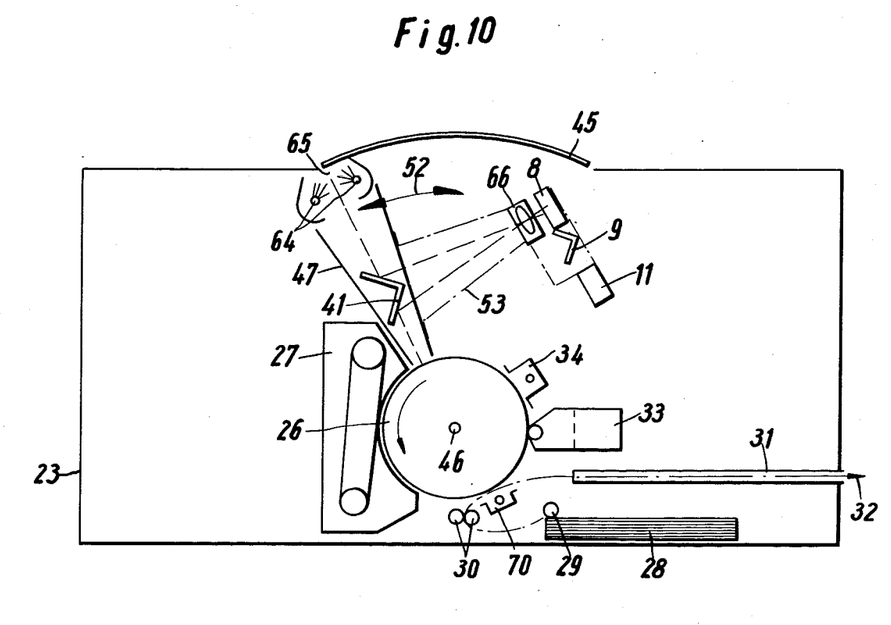
FIG. 10 shows a further diagrammatic representation of an embodiment of the apparatus, likewise with a drum-type receptor element, of which the powder image was obtained by image transfer.
Figure 11:
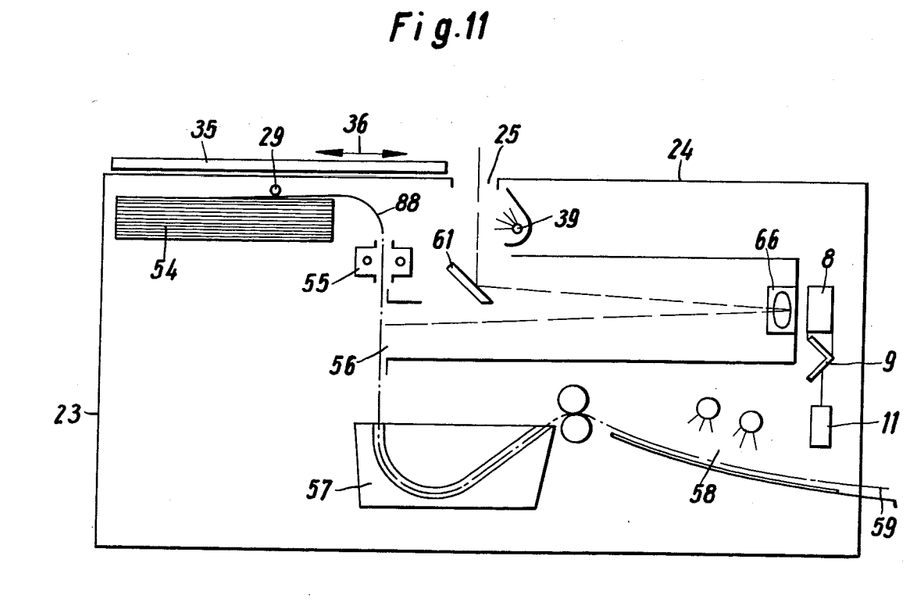
FIG. 11 shows a diagrammatic side view of a further form of the apparatus in which direct exposure takes place on a coated receptor element in the form of a sheet on which the image is developed directly.

FIG. 10 shows by way of comparison an apparatus which has a housing 23 on which, however, instead of the exposure slot, a transparent original support plate 45 is arranged so as to curve round a centre of curvature corresponding to the axis 46 of the selenium drum 26. The optical exposure system in this embodiment is constructed in known manner as a pivoting segment 47, which is pivotable about the axis 46 in known manner. The pivoting device is not shown in further detail, but it corresponds to the transport means 75 for the carriage 35 in FIG. 8 or the drive for the original roller guide pairs 48, 49, 50, 51 in FIG. 9, in order to move the segment 47 to and fro in accordance with the double arrow 52 under the curved support plate 45. The pivoting segment has a light source 64 for illuminating the original within an exposure slot 65, which here is movable. The angular reflector 41 or a corresponding prism is arranged in the pivoting segment and furthermore, by means of supports 53, the element consisting of at least one lens 66 and the prismatic reflector system 8, 9. In the embodiment of FIG. 10, in the position shown, the angular reflector system 8 is arranged behind the lens 66, because the relative direction of movement is reversed compared with the embodiments according to FIGS. 8 and 9. The drawing is only diagrammatic. The curved support plate 45 has so great a curvature or the unit with the prismatic or angular reflector system 8, 9 and its actuating means, not represented in FIG. 10 are arranged in such a way that contact-free movement under the support plate 45 is possible.

Where the previous forms of the apparatus have referred to a design for an indirect copy with a selenium drum, on to which an image has been projected, which has only been transformed after development by powder image transmission into a legible copy, FIG. 11 relates to a device for direct copying in which the image is projected directly on to a receptor element, in particular a copy sheet, e.g. a copy sheet coated with zinc oxide, and is also developed. For instance, according to FIG. 11, on the upper side 24 of the housing 23, in accordance with the representation in FIG. 8, a carriage 35 for the original is arranged, which can be moved to and fro in accordance with the double arrow 36. The exposure slot 25 is provided at the top and is illuminated by the light source 39. In its end positions, the carriage stop switches in accordance with 37, 38 in FIG. 8 which also, behind the lens, switch the systems 8 or 9 to and from in accordance with the manner shown in FIG. 8.

The receptor element is held in readiness in the form of a stack 54 of sheets and is moved by extraction means 29 on to a path 88 through a charging device 55 to an imaging slot 56. This is achieved by transfer means not shown in detail, which convey the receptor element in sheet form through a developing device 57 and a fixing device 58 to an outlet 59.

The image beam 60 is deflected to the lens 66 only via a deflection element 61, for instance a reflector and is reflected by the latter directly on to the imaging slot 56 and, according to the direction of movement of the carriage 35, one of the systems 9 or 8 is moved into place by means of the driving arrangement 11, FIGS. 1, 2 and 8.

Figure 12:
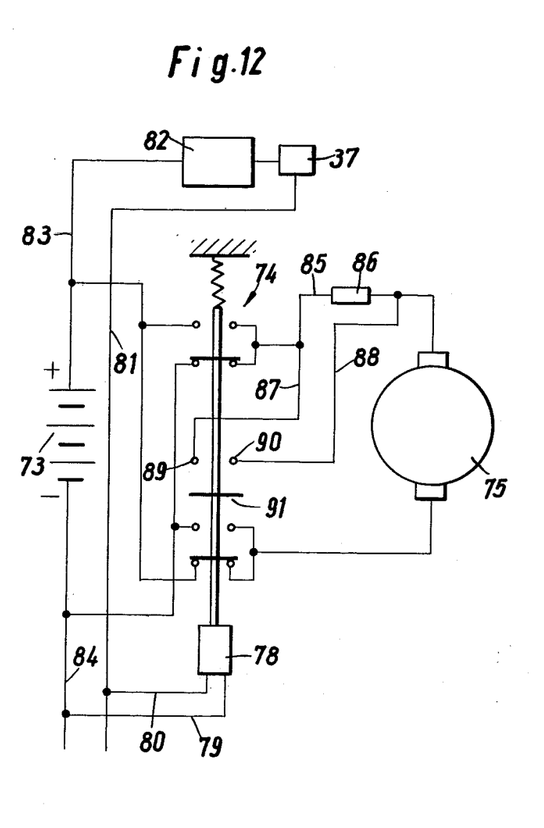
FIG. 12 shows a partial view of the circuit arrangement of FIG. 8 for explaining a special embodiment in which a driving motor rotates for guiding the original in different directions at different speeds.

In FIG. 12, using the circuit according to FIG. 8 the parts of which are denoted by the same references, an embodiment is shown in which the motor 75 runs more slowly in one direction of rotation. A series resistance 86 is included in a supply lead 85 of the motor 75. This is bridged by leads 87, 88 in one direction of rotation to which contacts 89, 90 are allotted in the reversing switch 74 of the direction of rotation, which has a special contact bridge 91 for the bridging circuit.

Figure 13:
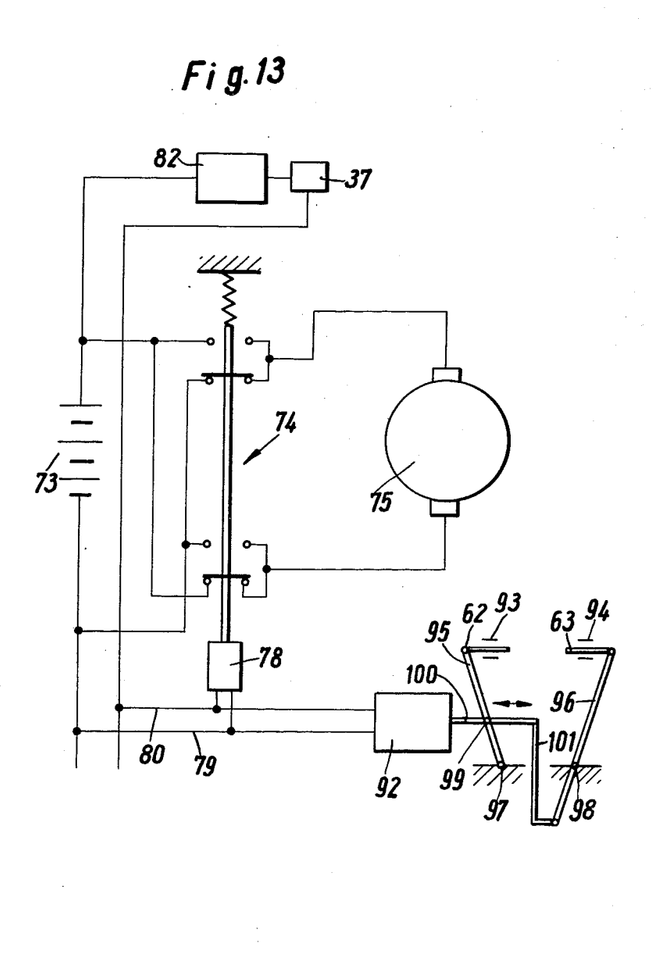
FIG. 13 is a partial representation of FIG. 8 with a supplement for providing another type of brightness reduction.

FIG. 13 shows an embodiment which has at the same time a drive, for the diaphragms 62, 63 according to FIG. 3.

Connected in parallel with the actuating magnet 78 of the reversing switch for the direction of rotation is a diaphragm actuating magnet 92 which is forced into one position by a built-in spring and is drawn into the other position on excitation. The diaphragms 62, 63 move in guides 93, 94 and are hinged to pivoting levers 95, 96 which are pivotable about pivot bearings attached to the housing 97, 98. For the purpose of oppositely-directed movement, the pivoting lever 96 is lengthened beyond its pivot bearing 98 and the extended portion is dimensioned in relation to the contact point 99 of an anchoring rod 100 of the actuating magnet 92. A frame 101 is arranged between the pivoting levers 95, 96. By this construction, the diaphragms 62, 63 can be moved in opposite directions; in one working position of the actuating magnet 92, they are closer and in another are drawn apart.

If the intensity of illumination is reduced with one type of transfer, i.e. in one driving direction of the reversible motor, it is accordingly possible to connect with the series resistance 86 in FIG. 12 a series resistance in front of the light source, or the actuating magnet 92 in FIG. 13 serves to actuate a switch for regulating the light intensity.

Figure 13A:
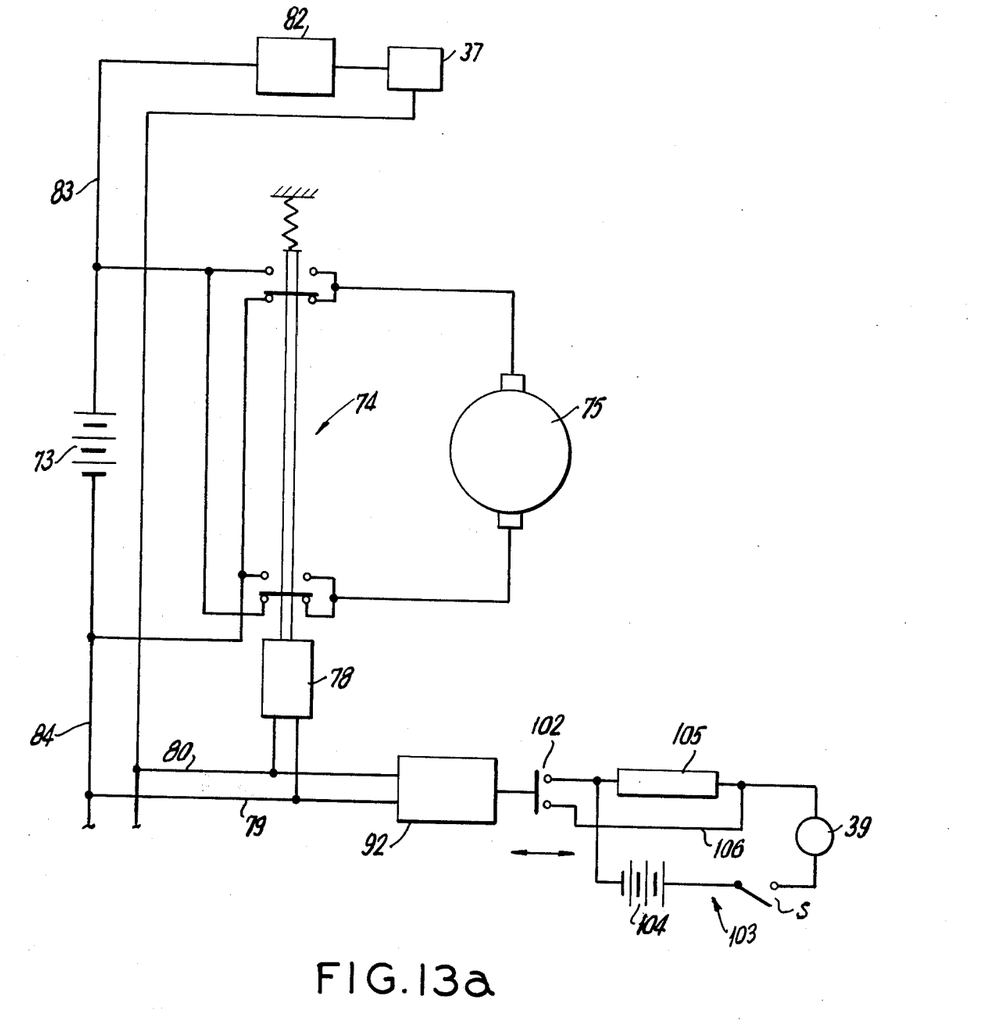
FIG. 13a is a representation similar to FIG. 13.

In FIG. 13a a circuit arrangement similar to FIG. 13 illustrates switch means for effecting a decrease in brightness of the sources of illumination in the illumination device. The magnet 92, shown in FIG. 13, closes a switch 102 in one driving direction of the motor 75 and opens the switch in the other driving direction. The light source 39 is contained in circuit 103 along with a current source 104. A series resistance 105 is located in circuit 103 and the resistance is bridged in one position of the switch 102. A switch S is provided in the circuit 103 so that the light source does not burn constantly. The switch S can be turned on along with the main switch of the apparatus.

Figure 14:
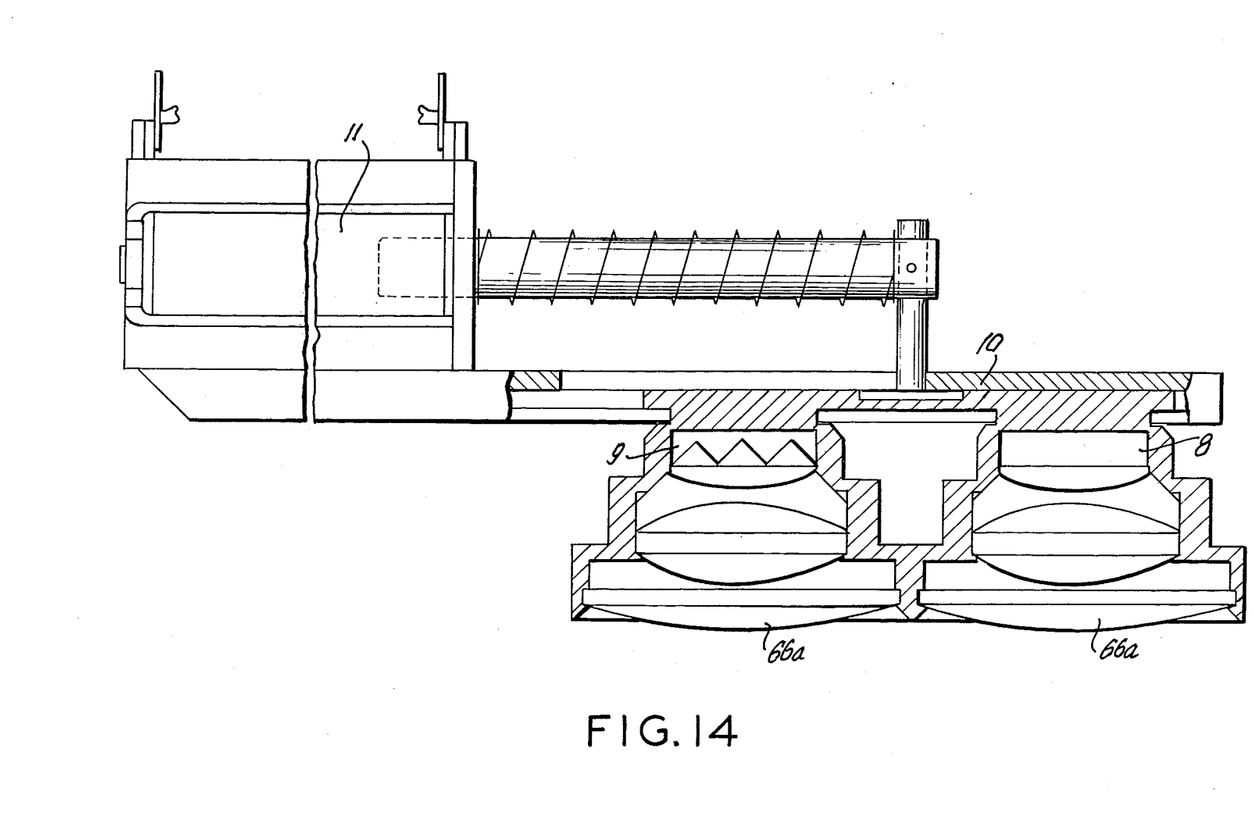
FIG. 14 is a diagrammatic arrangement of another embodiment of the arrangement shown in FIGS. 1 and 2.

While FIG. 3 shows that the diaphragms can be fixedly arranged on the requisite system, FIG. 13 shows a form of diaphragm such as can be arranged for reducing the brightness at the exposure light source. In FIG. 14 the reflector system 8, 9 are each shown in a fixed arrangement with a lens 66a. The reflector systems 8, 9 in combination with the lenses 66a are mounted on the support 10 and the driving arrangement 11 positions the support.

I claim:

1. An apparatus for the preparation of copies of an original, comprising an apparatus housing, an exposure slot associated with said housing, an illumination device including a light source within said housing arranged to direct light to said exposure slot in said housing, original support means on said housing for holding the original to be copied and said original support means and said exposure slot arranged to effect relative reciprocal movement therebetween, receptor means located within said housing for receiving an image of the original and arranged to move in said housing in one direction synchronously with the relative reciprocal movement between said original support means and said exposure slot, at least one image beam guide device within said housing between said exposure slot and said receptor means and displaceable between a first transmitting condition and a second transmitting condition for transmitting a linear image of the original to the receptor element, wherein the apparatus is arranged to transmit a copy-forming image of the original to the moving receptor means via the image beam guide device arranged in the first transmitting condition thereof during relative reciprocal movement between the original support means and said exposure slot in one direction and wherein the apparatus is further arranged to transmit a copy-forming image of the original to the moving receptor means via the image beam guide device arranged in the second transmitting condition thereof during relative reciprocal movement between the original support means and said exposure slot in the other direction, wherein said image beam guide device comprises at least one objective lens and a reflector arrangement having two separate reflector means arranged for reciprocal movement behind said at least one objective lens, one of said reflector means having an effective 90° angle for true-to-line picture reversal and the other of said reflector means having an angle of reflection different from 90° for line reversal and image reversal in the line, an imaging slot within said housing in the path of the image of the original passing to said receptor means said one of said reflector means being arranged with its edges at right-angles to said exposure slot and said other of said reflector means being arranged with its edges parallel to said imaging slot.

2. An apparatus according to claim 1, wherein each of said reflector means is provided behind an objective lens in a fixed arrangement.

3. An apparatus according to claim 1, wherein the effective 90° angle of said one of said reflector means is formed by a 45° system.

4. An apparatus according to claim 1, wherein said one of said reflector means is formed by a 45° system and said other one of said reflector means has an angle of reflection different from 90° for image inversion during a return stroke of the original.

5. An apparatus according to claim 4, wherein said other one of said reflector means has an angular deviation from 90° of up to about ± 10°.

6. An apparatus according to claim 5, wherein the said other one of said reflector means has an angle in the range of 84° to 96°.

7. An apparatus according to claim 1, wherein means are provided for varying the intensity of exposure as a function of the use of said reflector means in the image beam.

8. An apparatus according to claim 7, wherein switch means are provided for effecting a decrease in brightness of the sources of illumination in said illumination device.

9. An apparatus according to claim 1, wherein said original support means are reciprocally movably on said housing and are arranged for the original to be movable more rapidly in one direction of movement than in the other.

10. An apparatus according to claim 7, wherein a parallel arrangement of rows of said reflector means are arranged in conjunction with said objective lens.

11. An apparatus according to claim 1, for the production of copies by an indirect copy method, wherein said reflector means are arranged between said exposure slot and said receptor means, each said reflector means comprising an angled reflector member having its bisector on the axis of the lens and its limbs arranged to reflect an image beam to the exposure slot and an image beam to the receptor means in a substantially aligned manner.

12. An apparatus according to claim 11, wherein an optical system including the angled said reflector means and the light source in said illumination device is arranged to be pivotably movable in relation to said receptor means in the form of a drum located under said original support means comprising a concentrically curved original plane, with the pivoting movement of said optical system being controlled synchronously with the relative movement between said original support means and said exposure slot.

13. An apparatus according to claim 1, for the production of copies by a direct copy method, wherein one deflection mirror is provided between said reflector means and the exposure slot so that the image beam from said reflector means falls directly on to the receptor means which is moved essentially at right-angles to the original.

14. An apparatus according to claim 1, wherein said original support means comprises a reciprocating original support carrier which is movable over said exposure slot, limit switches spaced apart in the path of said support carrier, driving means for said reflector means, and said limit switches arranged to be contacted by said support carrier and at the same time also switch over said driving means for said reflector means.

15. An apparatus according to claim 14, wherein switches responsive to actuation of the driving means are provided for effecting variation in the rate of movement of said original support carrier, said driving means comprises a reversible driving motor, stops positioned within the path of the image of the original passing to said receptor means, and an actuating magnet for said stops is arranged to be respectively actuated for the original support carrier in one direction of rotation of the reversible driving motor.

16. An apparatus, according to claim 14, wherein said driving means comprises a reversible driving motor, stops positioned in the path of the image of the original passing to said receptor means, and an actuating magnet for said stops is arranged to be respectively actuated for the original support carrier in one direction of rotation of said reversible driving motor.

17. An apparatus, according to claim 1, wherein said original support means comprises a carriage reciprocally movably mounted on said housing for movement back and forth across said exposure slot.

18. An apparatus according to claim 1, wherein said original support means comprises a pair of rollers located on each side of said exposure slot with each said pair of rollers arranged to receive and hold the original therebetween and to be reciprocally driven for moving the original back and forth across said exposure slot.

19. An apparatus according to claim 1, wherein each said reflector means comprises a pair of angularly disposed mirrors with the intersection between the mirrors of one said reflector means being disposed perpendicularly to the intersection between said mirrors in the other said reflector means.

20. An apparatus according to claim 1, wherein each said reflector means comprises a prism associated with the prism of said other reflector means each said prism comprising reflector surfaces for receiving image beams from the original through said exposure slot and for directing image beams to said receptor means.

21. An apparatus as set forth in claim 1, wherein said receptor means comprises a selenium drum for receiving the image from the original and for transferring the image of the original to a copy sheet.

22. An apparatus according to claim 1, wherein said receptor means comprises a stack of copy sheets and means for moving individual ones of said copy sheets into position for receiving the image of the original directly from the original.

23. An apparatus according to claim 1, wherein the effective 90° angle of said one of said reflector means is formed by a 22.5° system.

24. An apparatus according to claim 1, wherein said one of said reflector means is formed by a 22.5° system and said other one of said reflector means has an angle of reflection different from 90° for image inversion during a return stroke of the original.

25. An apparatus according to claim 24, wherein said other one of said reflector means has an angular deviation from 90° of up to ± 10°.

26. An apparatus according to claim 25, wherein the said other one of said reflector means has an angle in the range of 84° to 96°.

* * * * *